United States Patent
Nakazawa et al.

(10) Patent No.: US 12,173,835 B2
(45) Date of Patent: Dec. 24, 2024

(54) ELECTRIC RESISTANCE WELDED STEEL PIPE, METHOD FOR MANUFACTURING THE SAME, AND AUTOMOTIVE STRUCTURAL MEMBER

(71) Applicant: JFE STEEL CORPORATION, Tokyo (JP)

(72) Inventors: Ryo Nakazawa, Tokyo (JP); Hiroyuki Shirosawa, Tokyo (JP); Shinsuke Ide, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 318 days.

(21) Appl. No.: 17/910,993

(22) PCT Filed: Mar. 15, 2021

(86) PCT No.: PCT/JP2021/010334
§ 371 (c)(1),
(2) Date: Sep. 12, 2022

(87) PCT Pub. No.: WO2021/187408
PCT Pub. Date: Sep. 23, 2021

(65) Prior Publication Data
US 2023/0141285 A1    May 11, 2023

(30) Foreign Application Priority Data
Mar. 18, 2020   (JP) .................................. 2020-047317

(51) Int. Cl.
*F16L 9/17* (2006.01)
*B21C 37/08* (2006.01)
(Continued)

(52) U.S. Cl.
CPC ............ *F16L 9/17* (2013.01); *B21C 37/0807* (2013.01); *B21C 37/30* (2013.01); *B21D 5/12* (2013.01)

(58) Field of Classification Search
CPC ............. B21C 37/06; B21C 37/08; F16L 9/17
(Continued)

(56) References Cited

U.S. PATENT DOCUMENTS 1,643,227 A * 9/1927 Stresau ................. B23K 9/035
                                                          219/148
1,829,638 A * 10/1931 Egler ..................... B23K 11/16
                                                          219/67

(Continued)

FOREIGN PATENT DOCUMENTS

| DE | 2835373 A1 | 2/1980 |
| EP | 2857537 A1 | 4/2015 |

(Continued)

OTHER PUBLICATIONS

Jun. 9, 2023 Extended European Search Report issued in European Patent Application No. 21770460.0.
(Continued)

*Primary Examiner* — Patrick F Brinson
(74) *Attorney, Agent, or Firm* — Oliff PLC

(57) ABSTRACT

An electric resistance welded steel pipe having excellent formability and torsional fatigue resistance and a method for manufacturing the same. The electric resistance welded steel pipe includes a seam region and a base metal region, the seam region having a range of ±10 degrees in a pipe circumferential direction with respect to an electric resistance welded seam formed in a pipe longitudinal direction, the base metal region being a region other than the seam region. The electric resistance welded steel pipe has an r-value in the pipe longitudinal direction of 1.0 or greater, H
(Continued)

(mm) and W (mm) satisfy a specified formula, and $Ts_{(MAX)}$ (mm) and $Tb_{(Ave)}$ (mm) satisfy a specified formula.

12 Claims, 4 Drawing Sheets

(51) Int. Cl.
  B21C 37/30 (2006.01)
  B21D 5/12 (2006.01)
(58) Field of Classification Search
  USPC .......................................... 138/171, 177, 178
  See application file for complete search history.

(56) References Cited

U.S. PATENT DOCUMENTS

| | | | | |
|---|---|---|---|---|
| 2,817,364 | A * | 12/1957 | Crawford | B21C 37/08 |
| | | | | 219/614 |
| 5,184,674 | A * | 2/1993 | Keyes | B21C 37/06 |
| | | | | 165/184 |
| 6,379,821 | B2 * | 4/2002 | Kushida | C22C 38/004 |
| | | | | 420/104 |
| 6,532,995 | B1 * | 3/2003 | Asahi | C22C 38/44 |
| | | | | 29/6.1 |
| 2013/0037162 | A1 * | 2/2013 | Shinohara | B23K 35/3073 |
| | | | | 138/171 |
| 2015/0204464 | A1 * | 7/2015 | Yano | F16L 9/02 |
| | | | | 138/171 |
| 2016/0033059 | A1 * | 2/2016 | Fonte | B23K 31/027 |
| | | | | 219/121.64 |
| 2019/0032819 | A1 * | 1/2019 | Wang | B21C 37/08 |

FOREIGN PATENT DOCUMENTS

| | | |
|---|---|---|
| EP | 3476953 A1 | 5/2019 |
| EP | 3816313 A1 | 5/2021 |
| JP | H11-151524 A | 6/1999 |
| JP | 2001-115238 A | 4/2001 |
| JP | 2006-274436 A | 10/2006 |
| JP | 5845623 B2 | 1/2016 |
| JP | 5942572 B2 | 6/2016 |
| WO | 2016/143271 A1 | 9/2016 |
| WO | 2019/188224 A1 | 10/2019 |
| WO | 2020003720 A1 | 1/2020 |

OTHER PUBLICATIONS

May 11, 2021 International Search Report issued in International Patent Application No. PCT/JP2021/010334.

* cited by examiner

ELECTRIC RESISTANCE WELDED STEEL PIPE, METHOD FOR MANUFACTURING THE SAME, AND AUTOMOTIVE STRUCTURAL MEMBER

TECHNICAL FIELD

This application relates to a technology for electric resistance welded steel pipes having excellent torsional fatigue resistance and, therefore, being suitable for automotive stabilizers.

BACKGROUND

In recent years, for the purpose of improving the fuel economy of automobiles, efforts have been made to reduce the weight of the vehicle body. A stabilizer is one of the members that form the vehicle body. While steel bars have been used in the stabilizer in the past, a trend is developing toward employing an electric resistance welded steel pipe, which has excellent productivity, to make a hollow stabilizer.

Since bending is performed for automotive parts, such as the stabilizer, high formability is required, and in addition, since bending and torsional stresses continuously act on the end product during its use, an excellent fatigue property (hereinafter, the fatigue property is also referred to as torsional fatigue resistance) is also required.

For example, Patent Literature 1 proposes an electric resistance welded steel pipe in which a region called a white layer is specified so that required torsional fatigue resistance can be satisfied; the region is a region of an electric resistance welded zone and has a low carbon content and, therefore, a lower post-quenching hardness than a surrounding region. Furthermore, Patent Literature 2 proposes an electric resistance welded steel pipe having improved torsional fatigue resistance, which is achieved by defining and limiting a weld defect area.

CITATION LIST

Patent Literature

PTL 1: Japanese Patent No. 5942572
PTL 2: Japanese Patent No. 5845623

SUMMARY

Technical Problem

Unfortunately, it cannot be said that the steel pipes proposed in Patent Literature 1 and 2 have sufficient torsional fatigue resistance.

To solve the problem, the disclosed embodiments are directed toward providing a technology for an electric resistance welded steel pipe having excellent formability and torsional fatigue resistance.

Solution to Problem

The present inventors conducted research regarding the torsional fatigue of steel pipes and found that stretch reduction rolling results in a change in an inner peripheral shape near an electric resistance welded seam of a steel pipe, and this change in shape affects the torsional fatigue property.

Furthermore, to achieve the object described above, the present inventors diligently performed studies regarding various schemes for improving the inner peripheral shape near the electric resistance welded seam regarding a method for performing stretch reduction rolling on a steel pipe by hot rolling. As a result, it was found that the inner peripheral shape near the electric resistance welded seam changes depending on the positions of the rolling rolls for the stretch reduction rolling process and of the electric resistance welded seam of the steel pipe during the process of stretch reduction rolling. Consequently, it was found that, for the stretch reduction rolling step, optimizing a feed position of the steel pipe with respect to the rolling rolls improves the inner peripheral shape and, therefore, enables realization of both high formability and an improved fatigue property.

The disclosed embodiments were completed based on the above-described findings and with additional studies. Specifically, a summary of the disclosed embodiments is as follows.

[1] An electric resistance welded steel pipe including a seam region and a base metal region, the seam region having a range of ±10° in a pipe circumferential direction with respect to an electric resistance welded seam formed in a pipe longitudinal direction, the base metal region being a region other than the seam region, wherein the electric resistance welded steel pipe has an r-value in the pipe longitudinal direction of 1.0 or greater, H (mm) and W (mm) satisfy formula (1) below, where H (mm) is a difference between $Ts_{(MIN)}$ (mm) and $Tb_{(Ave)}$ (mm) ($Tb_{(Ave)} - Ts_{(MIN)}$), $Ts_{(MIN)}$ (mm) is a minimum wall thickness value of the seam region, $Tb_{(Ave)}$ (mm) is an average wall thickness value of the base metal region, and W (mm) is an arc length of a pipe inner surface of the seam region, and $TS_{(MAX)}$ (mm) and $Tb_{(Ave)}$ (mm) satisfy formula (2) below, where $TS_{(MAX)}$ (mm) is a maximum wall thickness value of the seam region.

$$H/W \leq 0.10 \qquad \text{formula (1)}$$

$$Ts_{(MAX)}/Tb_{(Ave)} \leq 1.05 \qquad \text{formula (2)}$$

[2] The electric resistance welded steel pipe according to [1], wherein $Tb_{(Ave)}$ (mm) and $Db_{(Ave)}$ (mm) satisfy formula (3) below, where $Db_{(Ave)}$ (mm) is an average pipe outside diameter value of the base metal region.

$$(Tb_{(Ave)}/Db_{(Ave)}) \times 100 \geq 15\% \qquad \text{formula (3)}$$

[3] The electric resistance welded steel pipe according to [1] or [2], wherein the r-value is an r-value in the pipe longitudinal direction in the base metal region.

[4] A method for manufacturing the electric resistance welded steel pipe according to any one of [1] to [3], the method including:

performing a forming operation on a steel strip to form an open pipe;

performing electric resistance welding on the open pipe to form a hollow pipe; and heating the hollow pipe at a heating temperature of 650° C. or greater and performing stretch reduction rolling on the hollow pipe at an accumulated stretch reduction ratio of 30% or greater, wherein the stretch reduction rolling is performed in a manner that ensures that, in a rolling stand with a stretch reduction ratio of 5.0% or greater, the electric resistance welded seam does not travel through a region of a roll, the region having a range of ±5.0° with respect to a caliber center of the roll, and the electric resistance welded seam also does not travel through regions of the roll, the regions having a range of ±5.0° with respect to respective positions 360°/(n×2) left and right of the caliber center, where n is the number of rolls per stand.

[5] An automotive structural member in which the electric resistance welded steel pipe according to any one of [1] to [3] is used.

Advantageous Effects

The disclosed embodiments provide a technology for an electric resistance welded steel pipe having excellent formability and torsional fatigue resistance.

Specifically, the disclosed embodiments enable the manufacturing of a steel pipe having high formability, that is, having an r-value of 1.0 or greater and being designed to prevent galling of a plug, and also having excellent torsional fatigue resistance compared with that of the related art, and, therefore, the disclosed embodiments produce a remarkable industrial effect. Electric resistance welded steel pipes according to the disclosed embodiments are suitable for automotive structural members such as stabilizers which requires torsional fatigue resistance after being worked by bending, and forming of cross-sectional shapes.

DETAILED DESCRIPTION

<Electric Resistance Welded Steel Pipe>

A steel pipe of the disclosed embodiments is an electric resistance welded steel pipe including a seam region and a base metal region. The seam region has a range of ±10° in a pipe circumferential direction with respect to an electric resistance welded seam formed in a pipe longitudinal direction. The base metal region is a region other than the seam region. The electric resistance welded steel pipe has an r-value in the pipe longitudinal direction of 1.0 or greater. H (mm) and W (mm) satisfy formula (1) below, where H (mm) is a difference between $Ts_{(MIN)}$ (mm) and $Tb_{(Ave)}$ (mm) ($Tb_{(Ave)} - Ts_{(MIN)}$), $Ts_{(MIN)}$ (mm) is a minimum wall thickness value of the seam region, $Tb_{(Ave)}$ (mm) is an average wall thickness value of the base metal region, and W (mm) is an arc length of a pipe inner surface of the seam region. $TS_{(MAX)}$ (mm) and $Tb_{(Ave)}$ (mm) satisfy formula (2) below, where $TS_{(MAX)}$ (mm) is a maximum wall thickness value of the seam region. The electric resistance welded steel pipe has excellent torsional fatigue resistance.

$$H/W \leq 0.10 \qquad \text{formula (1)}$$

$$Ts_{(MAX)}/Tb_{(Ave)} \leq 1.05 \qquad \text{formula (2)}$$

Figure 1:
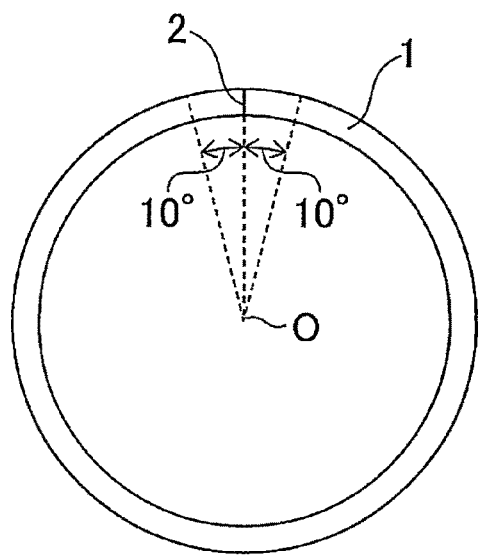
FIG. 1 is a plan view of a cross section of an electric resistance welded steel pipe.
Figure 2:
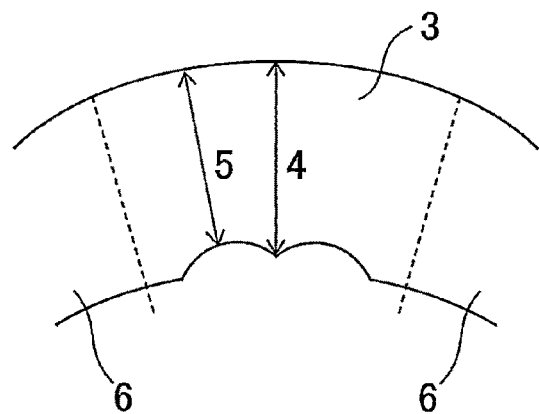
FIG. 2 is a plan view of a seam region.

Now, methods for measuring the dimensions will be described. FIG. 1 illustrates a cross-sectional shape of an electric resistance welded steel pipe 1, and FIG. 2 is an enlarged view of a seam region 3.

The seam region 3 is a region having a range of ±10° in the pipe circumferential direction with respect to an electric resistance welded seam 2, where a circle center O is defined as a center of a perpendicular cross section relative to a pipe axis direction (the longitudinal direction).

The average wall thickness value $Tb_{(Ave)}$ of a base metal region 6 is determined as follows. A wall thickness of the base metal region 6 is measured with a spherical-flat anvil type micrometer at positions at 40°, 80°, 120°, 160°, 200°, 240°, 280°, and 320°, with respect to a position of the electric resistance welded seam, which is assumed to be at 0°, and an average of the values is determined as $Tb_{(Ave)}$ (mm).

An average pipe outside diameter value $Db_{(Ave)}$ (mm) of the base metal region 6 is determined as follows. A pipe outside diameter of the base metal region 6 is measured with an outside micrometer at positions at 40°, 80°, 120°, and 160°, with respect to the position of the electric resistance welded seam 2, which is assumed to be at 0°, and an average of the values is determined as $Db_{(Ave)}$ (mm).

The arc length W (mm) of the pipe inner surface of the seam region 3 is defined according to formula (4) below.

$$W(mm) = (Db_{(Ave)} \text{ after stretch reduction} - 2 \times Tb_{(Ave)}) \times 20 \times \pi/360 \qquad \text{formula (4)}$$

$Ts_{(MIN)}$ (mm) and $Ts_{(MAX)}$ (mm) are respectively defined as a minimum wall thickness value of the seam region 3 (in FIG. 2, the position indicated by numeral 5 defines the minimum wall thickness value) and a maximum wall thickness value of the seam region 3 (in FIG. 2, the position indicated by numeral 4 defines the maximum wall thickness value).

Note that $Ts_{(MIN)}$ (mm) and $Ts_{(MAX)}$ (mm) are the minimum value and the maximum value, respectively, of wall thicknesses measured with a point micrometer every 1° over the zone of the seam region 3.

In the electric resistance welded steel pipe of the disclosed embodiments, the average wall thickness value $Tb_{(Ave)}$ of the base metal region 6 is not particularly limited and preferably may be 4.0 to 8.0 mm.

Furthermore, in the electric resistance welded steel pipe of the disclosed embodiments, the average pipe outside diameter value $Db_{(Ave)}$ is not particularly limited and preferably may be 20.0 to 45.0 mm.

r-value: 1.0 or greater

Now, the range of the r-value (Lankford value) will be described. In the disclosed embodiments, the r-value may be an r-value in the pipe longitudinal direction in the base metal region 6. When the r-value in the pipe longitudinal direction of the steel pipe 1 is greater than or equal to 1.0, a formability necessary for the manufacturing of stabilizers is satisfied. On the other hand, when the r-value of the steel pipe 1 is less than 1.0, the steel pipe 1 causes buckling when subjected to bending, and, consequently, the steel pipe 1 cannot be bent into a predetermined shape. Accordingly, the r-value in the pipe longitudinal direction of the steel pipe 1 is specified to be greater than or equal to 1.0. Preferably, the r-value is greater than or equal to 1.3. While the upper limit of the r-value is not particularly limited, the upper limit is preferably less than or equal to 2.0. This is because when the r-value is exclusively high, deformation is concentrated in the circumferential direction of the pipe, and, therefore, in instances where bending is performed on the steel pipe 1, a cross section of the steel pipe may be reduced in diameter, which may result in necking; consequently, a desired shape may not be obtained.

The r-value is determined as follows. A tensile test is conducted in which a 5 to 10% nominal strain is applied, then, a width-direction true strain eW with respect to a longitudinal-direction true strain eL is measured, and the r-value is calculated according to an equation of r-value=$\rho/(-1-\rho)$, where $\rho$ is the obtained slope. In this instance, for the tensile test, a JIS No. 12-A tensile test specimen is cut from the base metal region of the steel pipe, and a strain gauge with a gauge length of 2 mm is bonded to the tensile test specimen; accordingly, the test is conducted.

The r-value can be adjusted by controlling a heating temperature and an accumulated stretch reduction ratio that are employed for the stretch reduction rolling.

$$H/W \leq 0.10 \qquad \text{formula (1)}$$

Now, a reason for the limitation imposed on the H/W ratio of H (mm) to the arc length W (mm) of the pipe inner surface of the seam region 3 will be described.

H (mm) is the difference between the minimum wall thickness value $Ts_{(MIN)}$ (mm) of the seam region 3 and the average wall thickness value $Tb_{(Ave)}$ (mm) of the base metal region 6 ($Tb_{(Ave)} - Ts_{(MIN)}$). That is, $H = Tb_{(Ave)} - Ts_{(MIN)}$.

When a steep recess is present in the inner peripheral shape of the electric resistance welded steel pipe 1 as illustrated in FIG. 2 (see numeral 5 in FIG. 2), the torsional fatigue resistance becomes significantly low because stress is concentrated in the recess. An investigation revealed that when H/W, which serves as an indicator of the steepness of a recess of the seam region 3, is less than or equal to 0.10, the torsional fatigue resistance required is satisfied.

When H is a negative value, that is, when $Ts_{(MIN)}$ is greater than $Tb_{(Ave)}$, the seam region 3 has no recesses defining a thickness of the seam region 3 that is less than the thickness of the base metal region 6, and, consequently, the torsional fatigue resistance does not decrease.

Accordingly, in the disclosed embodiments, the ratio between H(mm) and W (mm) (H/W) is specified to be less than or equal to 0.10, where H(mm) is defined by the difference between the minimum wall thickness value $Ts_{(min)}$ (mm) of the seam region 3 and the average wall thickness value $Tb_{(Ave)}$ (mm) of the base metal region 6 ($Tb_{(Ave)} - Ts_{(MIN)}$), and W (mm) is the arc length of the seam region 3.

Preferably, H/W is less than or equal to 0.07, and more preferably, less than or equal to 0.05.

Preferably, H/W is greater than or equal to −0.10, and more preferably, greater than or equal to −0.07.

H/W can be adjusted to be in any of the above-mentioned ranges by, in a rolling stand in which stretch reduction is performed with a stretch reduction ratio per stand of greater than or equal to a specific value, feeding a hollow pipe 12 in a manner that ensures that the electric resistance welded seam 2 avoids regions of a roll, the regions having a specific range with respect to a caliber end or a caliber center of the roll.

$$Ts_{(MAX)}/Tb_{(Ave)} \leq 1.05 \qquad \text{formula (2)}$$

Now, a reason for the limitation imposed on the ratio between the maximum wall thickness value $Ts_{(MAX)}$ (mm) of the seam region 3 and $Tb_{(Ave)}$ (mm) ($Ts_{(MAX)}/Tb_{(Ave)}$) will be described. Regarding the torsional fatigue resistance, the greater the wall thickness of the seam region relative to the wall thickness of the base metal region 6, the less likely it is that a fracture initiated from the seam region 3 occurs.

Figure 3:
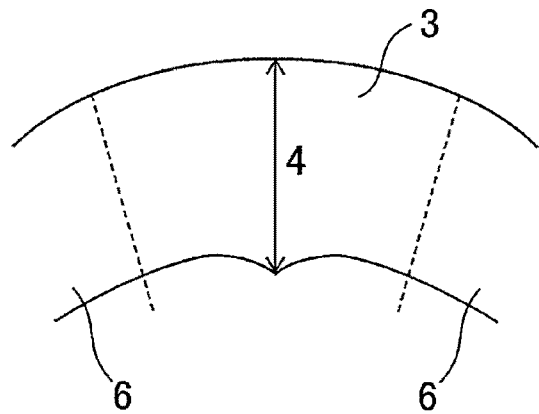
FIG. 3 is a plan view of the seam region in an instance in which a maximum wall thickness value $Ts_{(MAX)}$ of the seam region has exceeded an average wall thickness value $Tb_{(Ave)}$ of a base metal region.

Now, reference is made to FIG. 3. FIG. 3 is a plan view of the seam region 3 in an instance in which the maximum wall thickness value $Ts_{(MAX)}$ of the seam region 3 has exceeded the average wall thickness value $Tb_{(Ave)}$ of the base metal region 6.

When $Ts_{(MAX)}$ (see numeral 4 in FIG. 3) is greater than $Tb_{(Ave)}$, as illustrated in FIG. 3, a problem may occur during cold drawing that is performed after the stretch reduction rolling. The cold drawing is a process in which a plug is inserted into the steel pipe, and the steel pipe is then drawn through a die by cold drawing. When a protrusion is formed on an inner periphery of the seam region 3, a problem arises in that the plug inserted is damaged, and another problem arises in that the inner periphery ends up having a portion with which the plug cannot come into contact.

In this regard, by ensuring that $Ts_{(MAX)}/Tb_{(Ave)}$, which serves as an indicator of the increase in the wall thickness of the seam region 3, is less than or equal to 1.05, the occurrence of these problems can be inhibited.

Accordingly, in the disclosed embodiments, the ratio between the maximum wall thickness value $Ts_{(MAX)}$ (mm) of the seam region and $Tb_{(Ave)}$ (mm) ($Ts_{(MAX)}/Tb_{(Ave)}$) is specified to be less than or equal to 1.05.

Preferably, $Ts_{(MAX)}/Tb_{(Ave)}$ is less than or equal to 1.04, and more preferably, less than or equal to 1.03.

Preferably, $Ts_{(MAX)}/Tb_{(Ave)}$ is greater than or equal to 0.90, and more preferably, greater than or equal to 0.95.

$Ts_{(MAX)}/Tb_{(Ave)}$ can be adjusted to be in any of the above-mentioned ranges by, in a rolling stand in which stretch reduction is performed with a stretch reduction ratio per stand of greater than or equal to a specific value, feeding the electric resistance welded seam 2 to a position such that the electric resistance welded seam 2 avoids regions of a roll, the regions having a specific range with respect to a caliber end or a caliber center of the roll.

$$(Tb_{(Ave)}/Db_{(Ave)}) \times 100 \geq 15\% \qquad \text{formula (3)}$$

Furthermore, in the steel pipe of the disclosed embodiments, it is preferable that $(Tb_{(Ave)}/Db_{(Ave)}) \times 100$ be greater than or equal to 15%, where $(Tb_{(Ave)}/Db_{(Ave)})$ is a ratio between $Tb_{(Ave)}$ (mm) and the average pipe outside diameter value $Db_{(ave)}$ (mm) of the base metal region.

A reason for the limitation imposed on $Tb_{(Ave)}/Db_{(Ave)}$ is as follows.

By reducing $Tb_{(Ave)}/Db_{(Ave)}$, a weight can be reduced; however, when $(Tb_{(Ave)}/Db_{(Ave)}) \times 100$ is less than 15%, a rigidity and strength required of a component may not be satisfied. Accordingly, it is preferable that the steel pipe, as a substitute for a steel bar, have dimensions that satisfy $(Tb_{(Ave)}/Db_{(Ave)}) \times 100 \geq 15\%$.

Preferably, $(Tb_{(Ave)}/Db_{(Ave)}) \times 100$ is greater than or equal to 15.5%, and more preferably, greater than or equal to 16.0%.

Preferably, $(Tb_{(Ave)}/Db_{(Ave)}) \times 100$ is less than or equal to 45%, and more preferably, less than or equal to 40%.

Now, a suitable chemical composition of the steel pipe used in the disclosed embodiments will be described. In the following description of the chemical composition, "mass %" is simply indicated as "%" unless otherwise specified.

C: 0.55% or Less

C is an element that contributes to increasing strength, and an addition of C improves fatigue resistance. However, when a C content is greater than 0.55%, weldability is reduced, and, consequently, a stable electric resistance welding quality may not be achieved. Accordingly, it is preferable that the C content be less than or equal to 0.55%. More preferably, the C content is less than or equal to 0.45%. In addition, preferably, the C content is greater than or equal to 0.2%.

Si: 0.01 to 1.0%

Si increases the strength of steel by deoxidizing the steel and by being dissolved in the steel. In terms of producing the effect, it is preferable that a Si content be greater than or equal to 0.01%. When the Si content is greater than 1.0%, the steel pipe may have reduced hardenability. Accordingly, it is preferable that the Si content be 0.01 to 1.0%. More preferably, the Si content is greater than or equal to 0.1%. In addition, more preferably, the Si content is less than or equal to 0.4%.

Mn: 0.2 to 3.0%

Mn has an effect of improving hardenability. The effect is produced when Mn is present in an amount greater than or equal to 0.2%. However, when a Mn content is greater than 3.0%, an electric resistance welding quality may be degraded. Accordingly, it is preferable that the Mn content be 0.2 to 3.0%. More preferably, the Mn content is greater than or equal to 0.5%. In addition, more preferably, the Mn content is less than or equal to 2.0%.

P: 0.01% or Less

P segregates at grain boundaries and the like, which reduces toughness, and, therefore, it is desirable that P be reduced as much as possible in the disclosed embodiments; however, a P content of up to 0.01% is permissible. Accordingly, it is preferable that the P content be less than or equal to 0.01%. More preferably, the P content is less than or equal to 0.005%.

S: 0.01% or Less

S is an element that is present as sulfide inclusions in steel and reduces formability and fatigue resistance, and therefore, it is desirable that S be reduced as much as possible in the disclosed embodiments; however, a S content of up to 0.01% is permissible. Accordingly, it is preferable that the S content be less than or equal to 0.01%. More preferably, the S content is less than or equal to 0.005%.

Cr: 2.0% or Less

Cr is an element that improves hardenability and is, therefore, effective for increasing the strength of steel, thereby improving the fatigue property thereof. However, when Cr is present in an amount greater than 2.0%, a Cr oxide may remain in the electric resistance welded seam, and, consequently, the electric resistance welding quality may be degraded. Accordingly, it is preferable that a Cr content be less than or equal to 2.0%. More preferably, the Cr content is less than or equal to 0.5%. In addition, preferably, the Cr content is greater than or equal to 0.001%.

Ti: 0.1% or Less

Ti has a function of forming TiN in steel, thereby fixing N. However, when a Ti content is greater than 0.1%, the formability and toughness of steel may be reduced. Accordingly, it is preferable that the Ti content be less than or equal to 0.1%. More preferably, the Ti content is less than or equal to 0.04%. In addition, preferably, the Ti content is greater than or equal to 0.01%.

Al: 0.1% or Less

Al is an element that is effective for deoxidization and is necessary for inhibiting the growth of austenite grains during quenching, thereby ensuring a strength resulting from quenching. However, when an Al content is greater than 0.1%, the effects no longer increase, and in addition, Al-containing inclusions increase, which may reduce fatigue strength. Accordingly, it is preferable that the Al content be less than or equal to 0.1%. More preferably, the Al content is less than or equal to 0.08%. In addition, preferably, the Al content is greater than or equal to 0.01%.

V: 0.5% or Less

V is an element that forms fine carbides, thereby contributing to increasing the strength of steel. However, when a V content is greater than 0.5%, the effect no longer increases, and, therefore, an effect commensurate with the content cannot be expected, that is, an economic disadvantage arises. Accordingly, it is preferable that the V content be less than or equal to 0.5%. More preferably, the V content is less than or equal to 0.3%. In addition, preferably, the V content is greater than or equal to 0.01%.

Nb: 0.1% or Less

Nb is an element that forms fine carbides, thereby contributing to increasing the strength of steel. However, when a Nb content is greater than 0.1%, the effect no longer increases, and, therefore, an effect commensurate with the content cannot be expected, that is, an economic disadvantage arises. Accordingly, it is preferable that the Nb content be less than or equal to 0.1%. More preferably, the Nb content is less than or equal to 0.03%. In addition, preferably, the Nb content is greater than or equal to 0.001%.

Mo: 1.0% or Less

Mo is an element that improves hardenability, thereby contributing to increasing the strength of steel. However, when a Mo content is greater than 1.0%, the effect no longer increases, and, therefore, an effect commensurate with the content cannot be expected, that is, an economic disadvantage arises. Accordingly, it is preferable that the Mo content be less than or equal to 1.0%. More preferably, the Mo content is less than or equal to 0.3%. In addition, preferably, the Mo content is greater than or equal to 0.01%.

Cu: 2.0% or Less

Cu is an element that increases hardenability and is, therefore, effective for increasing the strength of steel, thereby improving the fatigue strength thereof. However, when Cu is present in an amount greater than 2.0%, the formability may be reduced. Accordingly, it is preferable that a Cu content be less than or equal to 2.0%. More preferably, the Cu content is less than or equal to 0.5%. In addition, preferably, the Cu content is greater than or equal to 0.001%.

Ni: 2.0% or Less

Ni is an element that increases hardenability and is, therefore, effective for increasing the strength of steel, thereby improving the fatigue strength thereof. However, when Ni is present in an amount greater than 2.0%, the formability may be reduced. Accordingly, it is preferable that a Ni content be less than or equal to 2.0%. More preferably, the Ni content is less than or equal to 0.5%. In addition, preferably, the Ni content is greater than or equal to 0.001%.

B: 0.005% or Less

B is an element that increases the hardenability of steel even when B is present in a small amount. However, when a B content is greater than 0.005%, the effect no longer increases, and the fatigue property is reduced because B segregates at grain boundaries, which promotes an intergranular fracture. Accordingly, it is preferable that the B content be less than or equal to 0.005%. More preferably, the B content is less than or equal to 0.0050%. In addition, preferably, the B content is greater than or equal to 0.0003%.

N: 0.01% or Less

N is an element inevitably present in steel. N combines with nitride-forming elements in steel, thereby contributing to inhibiting the coarsening of the grains and also increasing the strength resulting from tempering. However, when N is present in an amount greater than 0.01%, the toughness of the electric resistance welded seam may be reduced, and the formability may be degraded. Accordingly, it is preferable that a N content be less than or equal to 0.01%. More preferably, the N content is less than or equal to 0.005%.

The balance, other than the components described above, is Fe and incidental impurities.

<Method for Manufacturing Electric Resistance Welded Steel Pipe>

Figure 4:
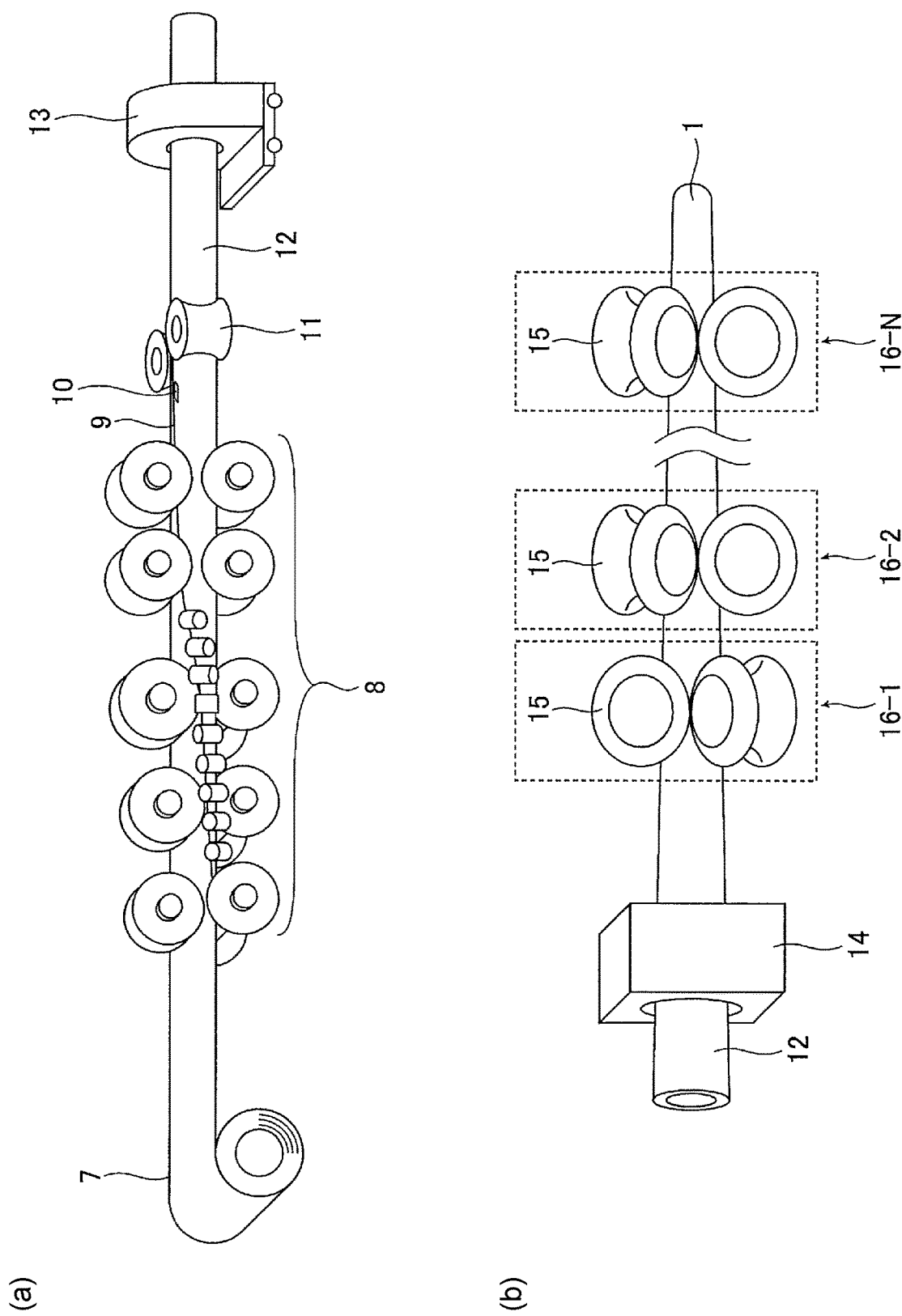
FIG. 4 is an external view of a manufacturing line for an electric resistance welded steel pipe of an embodiment.

Now, a method for manufacturing the steel pipe will be described with reference to FIG. 4. FIG. 4 is a schematic illustration of a line for manufacturing the electric resistance welded steel pipe of the disclosed embodiments.

In the disclosed embodiments, as illustrated in FIG. 4(a), a continuous forming operation is first performed on a steel strip 7 with a continuous forming machine 8 or the like to form an open pipe 9, and then, electric resistance welding is performed on the open pipe with a welding means 10 to form the hollow pipe 12. Note that in the disclosed embodiments, the hollow pipe 12 may be obtained by performing electrical resistance welding on circumferentially abutting portions of the steel strip 7 by using the welding means 10 while the abutting portions are pressed against each other by squeeze rolls 11.

Furthermore, the hollow pipe 12 may be cut to predetermined dimensions by using a cutting machine 13.

After the hollow pipe 12 is obtained, the hollow pipe (pipe body) 12 is heated at a heating temperature of 650° C. or greater with a heating means 14, and stretch reduction rolling is then performed on the hollow pipe 12 at an accumulated stretch reduction ratio of 30% or greater by using rolling rolls (hereinafter also referred to simply as rolls) 15, as illustrated in FIG. 4(b). For the stretch reduction rolling performed with the rolling rolls 15, a plurality of rolling stands 16-1, 16-2 . . . , and 16-N(N is a natural number) may be used to progressively perform the stretch reduction.

Note that the stretch reduction ratio is defined by formula (5) below.

Stretch reduction ratio (%)=100×($Db_{(Ave)}$ before stretch reduction–$Db_{(Ave)}$ after stretch reduction)/$Db_{(Ave)}$ before stretch reduction    formula (5)

More specifically, the accumulated stretch reduction ratio can be determined by formula (6) below.

Accumulated stretch reduction ratio (%)=100× ($Db_{(Ave)}$ before stretch reduction at first stand– $Db_{(Ave)}$ after stretch reduction at final stand)/ $Db_{(Ave)}$ before stretch reduction at first stand    formula (6)

By using a heating temperature of 650° C. or greater for the stretch reduction rolling of the steel pipe and using an accumulated stretch reduction ratio of 30% or greater for the stretch reduction rolling, it is possible to achieve an r-value of the processed steel pipe of 1.0 or greater; consequently, in bending of the steel pipe, the steel pipe can be bent into a desired shape.

The heating temperature is preferably greater than or equal to 700° C. and more preferably greater than or equal to 800° C.

Furthermore, the heating temperature is preferably less than or equal to 1050° C. and more preferably less than or equal to 1000° C.

The accumulated stretch reduction ratio is preferably greater than or equal to 35% and more preferably greater than or equal to 40%.

Furthermore, the accumulated stretch reduction ratio is preferably less than or equal to 90% and more preferably less than or equal to 85%.

In the disclosed embodiments, the stretch reduction rolling is performed in a manner that ensures that, in a rolling stand with a stretch reduction ratio of 5.0% or greater, the electric resistance welded seam 2 does not travel through a region of a roll, the region having a range of ±5.0° with respect to a caliber center of the roll, and the electric resistance welded seam 2 also does not travel through regions of the roll, the regions having a range of ±5.0° with respect to respective positions 360°/(n×2) left and right of the caliber center, where n is the number of rolls per stand. As referred to herein, the stretch reduction ratio at an Nth rolling stand is determined by formula (7) below.

Stretch reduction ratio (%)=100×($Db_{(Ave)}$ before stretch reduction at Nth stand–$Db_{(Ave)}$ after stretch reduction at Nth stand)/$Db_{(Ave)}$ before stretch reduction at Nth stand    formula (7)

Now, a reason for the limitation imposed on a feed position of the electric resistance welded seam 2 in the rolling stand will be described. As referred to herein, the feed position of the electric resistance welded seam 2 is a circumferential position in an instance in which the steel pipe is fed into stretch reduction rolling rolls; the feed position is a position defined assuming that, as viewed from a direction in which the steel pipe is advanced, the steel pipe is rotated in a counterclockwise direction about a center of the steel pipe with respect to a ceiling direction. In this instance, the ceiling direction is assumed to correspond to 0°. Furthermore, the "respective positions 360°/(n×2) left and right of the caliber center" can also be expressed as "respective positions±360°/(n×2) away from the caliber center".

Figure 5:
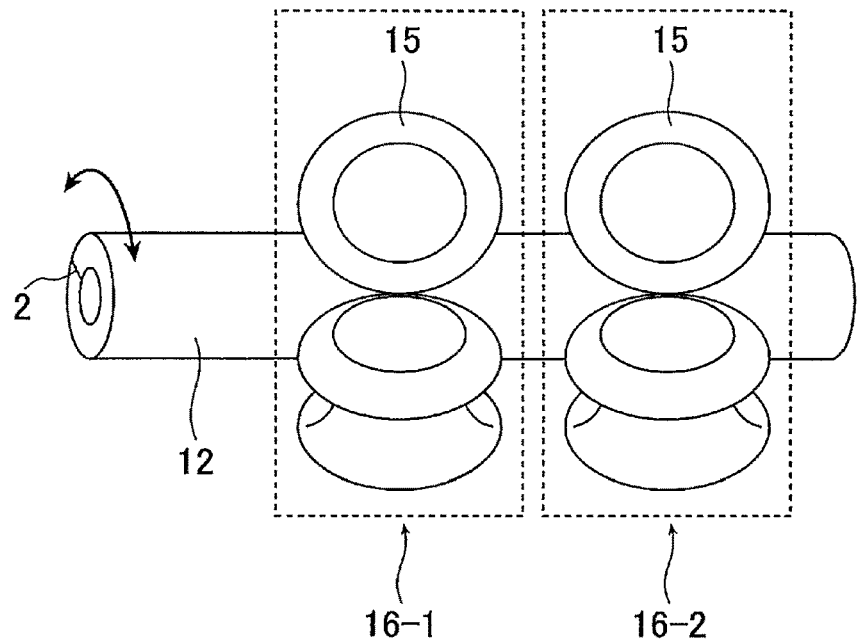
FIG. 5 is an external view illustrating a position of an electric resistance welded seam in an instance in which the electric resistance welded steel pipe is fed into rolling rolls.
Figure 6:
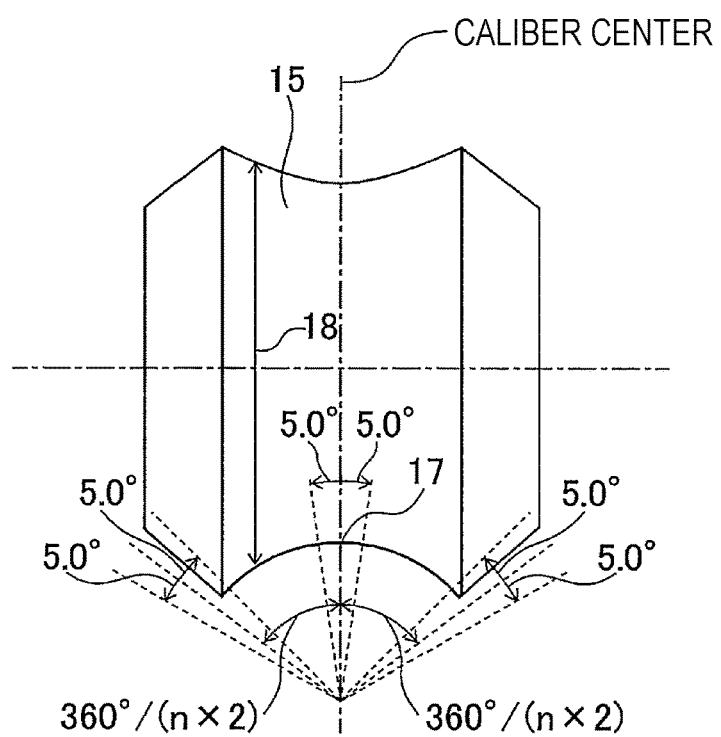
FIG. 6 is an external view illustrating regions of a rolling roll where contact of the electric resistance welded seam should be avoided, in embodiments.

FIG. 5 is a view illustrating the feed position of the electric resistance welded steel pipe. Furthermore, FIG. 6 is an external view illustrating positions of a rolling roll 15 where contact of the electric resistance welded seam 2 should be avoided, in the disclosed embodiments. The present inventors directed their attention to the fact that in an instance where stretch reduction rolling is performed on a steel pipe by using the rolls 15, a wall thickness corresponding to a region near a caliber end of the rolls 15 used for rolling is increased, and a wall thickness corresponding to a caliber center 17 thereof is reduced, in a cross section of the steel pipe.

The roll 15 is a roll for performing stretch reduction rolling on a steel pipe and has a caliber formed in a circumferential direction of the roll. A plurality of the rolls 15 holds the steel pipe (hollow pipe 12) on the calibers while the rolls 15 rotate. As viewed in a perpendicular cross section of the steel pipe relative to an axial direction (longitudinal direction) thereof (pipe-axis-direction perpendicular cross section), the caliber has a curved shape conforming to an outer periphery of the steel pipe in the pipe-axis-direction perpendicular cross section. A caliber center 17 located at a position of an arc where a caliber diameter 18 has a minimum value is a caliber bottom; the caliber diameter 18 is defined as having a center in an axis of rotation of the roll.

The present inventors specified various positions in the circumferential direction for the electric resistance welded seam 2 and fed the hollow pipe 12 into the stretch reduction rolling rolls 15 (16-1), as illustrated in FIG. 5. As a result, it was found that a good inner peripheral shape, with a low degree of deformation, can be maintained in instances in which the hollow pipe 12 was fed, as illustrated in FIG. 6, in a manner that ensures that, in a rolling stand for stretch reduction rolling with a stretch reduction ratio per stand of 5.0% or greater, the electric resistance welded seam 2 avoided a region of a roll 15, the region having a range of ±5.0° with respect to the caliber center 17, and the electric resistance welded seam 2 also avoided regions of the roll 15, the regions having a range of ±5.0° with respect to respective positions 360°/(n×2) left and right of the caliber center 17, where n is the number of rolls per stand.

As used herein, the expression "±5.0° with respect to the caliber center 17" means a range of ±5.0° in a sector shape in which the caliber center 17 is assumed to be at 0 degrees. The sector shape is defined by assuming that an outer peripheral portion of the caliber as viewed in a pipe-axis-direction perpendicular cross section of the roll 15 has the sector shape, which conforms to a cross-sectional circle of the steel pipe and is a sector shape with a circular center thereof being a center of the cross-sectional circle of the steel pipe. Furthermore, the expression "±5.0° with respect to respective positions 360°/(n×2) away from the caliber center 17, where n is the number of rolls per stand" has the following meanings, for example: in an instance in which rolling is performed with 4 rolls, the expression means ranges of ±5.0° in a circumferential direction with respect to respective positions 45° (=360°/(4×2)) left and right of the caliber center 17, and in an instance in which rolling is performed with 3 rolls, the expression means ranges of ±5.0° in the circumferential direction with respect to respective positions 60° (=360°/(3×2)) left and right of the caliber center 17. In the disclosed embodiments, regarding rolls 15 adjacent to each other in the pipe circumferential direction, the region having a range of ±5.0° of the left-side roll 15, with respect to the position 360°/(n×2) away from the caliber center 17, the position being on the right-end side, may overlap the region having a range of ±5.0° of the right-side roll 15, with respect to the position 360°/(n×2) away from the caliber center 17, the position being on the left-end side. This may be possible in terms of workability.

As described, to obtain an electric resistance welded steel pipe having excellent formability and torsional fatigue resistance, the stretch reduction rolling is performed in a manner that ensures that, in a rolling stand with a stretch reduction ratio of 5.0% or greater, the electric resistance welded seam does not travel through a region of a roll, the region having a range of ±5.0° with respect to the caliber center of the roll, and the electric resistance welded seam also does not travel through regions of the roll, the regions having a range of ±5.0° with respect to respective positions 360°/(n×2) left and right of the caliber center, where n is the number of rolls per stand.

Furthermore, there are methods for limiting circumferential displacement of the electric resistance welded seam 2 of the pipe during the stretch reduction rolling, thereby feeding the pipe to a target feed position more reliably. Examples of the methods include, but are not limited to, a method in which a roll-type guide is installed between adjacent rolling stands 16 and is used to limit circumferential displacement of the pipe during its passage between the stands 16; a method in which a tensile stress is applied from a rear side during the stretch reduction rolling; and a method in which the electric resistance welding and the stretch reduction rolling are continuously performed.

The obtained steel pipe 1 may be subjected to an induction hardening process and a tempering process. The induction hardening process may be a process in which the steel pipe 1 is heated under the conditions of a heating temperature of 850 to 1050° C. and a holding time of 1 to 1800 s and is subsequently water-quenched. The tempering process may be a process in which the steel pipe 1 is held at 150 to 450° C. for 5 to 60 minutes and is subsequently air-cooled.

The electric resistance welded steel pipe 1 of the disclosed embodiments, described above, can be used in automotive structural members, such as automotive stabilizers.

EXAMPLES

Now, the disclosed embodiments will be further described based on Examples.

Open pipes were formed by performing a continuous forming operation on steel strips of two steel grades, A and B, as shown in Table 1. Subsequently, electric resistance welding was performed on the open pipes to form hollow pipes. The hollow pipes were subjected to stretch reduction rolling, which was performed at various accumulated stretch reduction ratios, heating temperatures, and feed positions for a rolling stand for stretch reduction rolling. Accordingly, steel pipes Nos. A-1 to A-19 and B-1 to B-19 were obtained. Steel pipes Nos. A-1 to A-19 were manufactured from the steel strip of steel grade A, and steel pipes Nos. B-1 to B-19 were manufactured from the steel strip of steel grade B.

Figure 7:
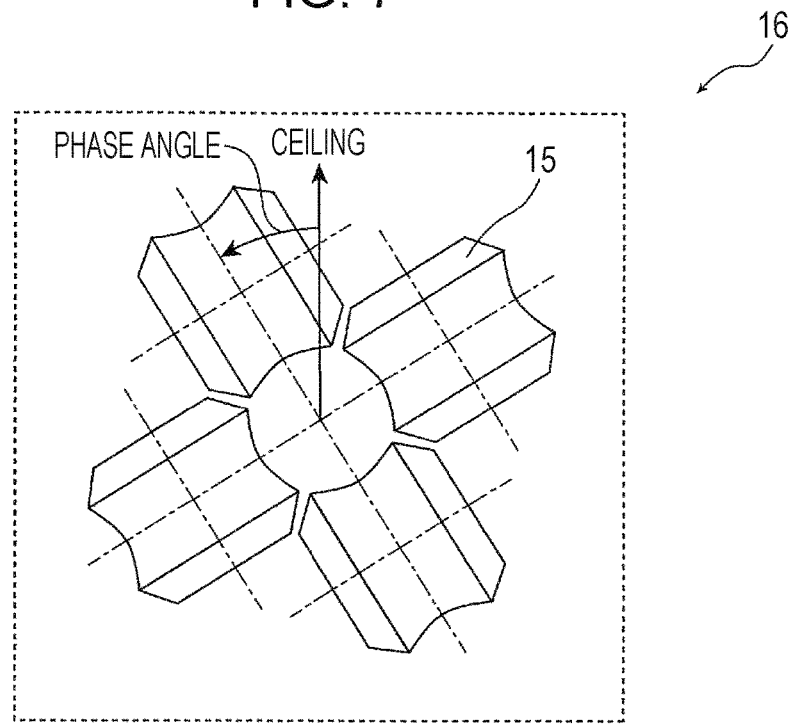
FIG. 7 is a plan view of rolling rolls illustrating a phase angle of a rolling roll.

Table 2 shows the stretch reduction schedule. Furthermore, FIG. 7 is a plan view of rolling rolls illustrating a phase angle of a rolling roll shown in Table 2.

The phase angle shown in Table 2 is an angle(°) representing a position of the caliber center (caliber bottom) of a rolling roll 15 of each of the stands 16 in a circumferential direction with respect to a ceiling. As illustrated in FIG. 7, for patterns A to D, which are 4-roll patterns, the rolling roll 15 is one located in a 0 to 90° counterclockwise region with respect to the ceiling, with a center of the steel pipe being assumed to be the axis.

Furthermore, for pattern E, which is a 3-roll pattern, the phase angle shown in Table 2 is an angle(°) representing a position of the caliber bottom of a rolling roll 15 of each of the stands 16 in the circumferential direction with respect to the ceiling, and the rolling roll 15 is one located in a 0 to 120° counterclockwise region with respect to the ceiling.

Table 3 and Table 4 show the stretch reduction conditions, including the stretch reduction patterns, used for the manufacturing of steel pipes Nos. A-1 to A-19 and B-1 to B-19.

Figure 8:
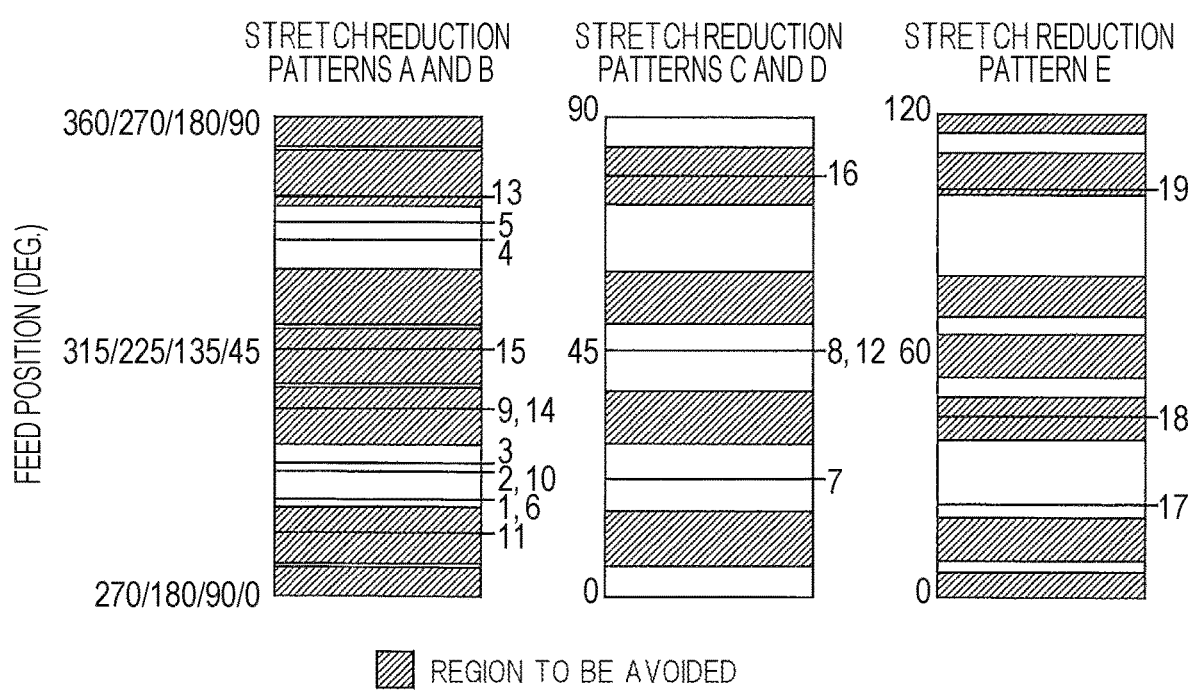
FIG. 8 is a diagram illustrating a relationship between a feed position of the electric resistance welded seam with respect to the rolling rolls and the regions of the rolling rolls where contact of the electric resistance welded seam should be avoided, regarding Examples.

The feed position of each of the steel pipes for the rolling rolls, shown in Table 3 and Table 4, is also shown in FIG. 8 for each of the stretch reduction patterns. Each of the angles was a counterclockwise angle determined with respect to the ceiling and a rolling direction (see FIG. 7, too).

Specifically, regarding the stretch reduction patterns A and B (n=4 for both), the instances in which the condition of the manufacturing conditions of the disclosed embodiments, which is to ensure that the electric resistance welded seam does not travel through a region of a roll, the region having a range of ±5.0° with respect to the caliber center of the roll, and the electric resistance welded seam also does not travel through regions of the roll, the regions having a range of ±5.0° with respect to respective positions 360°/(n×2) left and right of the caliber center, where n is the number of rolls per stand, (the condition is hereinafter referred to as a "condition P"), was satisfied are as follows: for respective ones of the stands Nos. 5 to 10, which had a stretch reduction ratio of 5.0% or greater, instances in which the feed position of the seam (electric resistance welded seam) was not located within regions having a range of ±5.0° with respect to respective phase angles of 11.25°, 56.25°, 78.75°, 33.75°, 0°, and 45°, and in addition, the feed position of the seam (electric resistance welded seam) was not located within regions having a range of ±5.0° with respect to respective phase angles of the foregoing angles ±45° (=360°/(4×2)), namely, −33.75° (regarded as 56.25° (90° added to)−33.75° for evaluation), 56.25°, 11.25°, 101.25° (regarded as 11.25° (90° subtracted from 101.25°) for evaluation), 33.75°, 123.75° (regarded as 33.75° (90° subtracted from 123.75°) for evaluation), −11.25° (regarded as 78.75° (90° added to −11.25°) for evaluation), 78.75°, −45° (regarded as 45° (90° added to)−45° for evaluation), 45°, 0°, and 90° (regarded as 0° (90° subtracted from 90°) for evaluation).

Regarding the steel pipes that employed the stretch reduction pattern A or B, the feed position of steel pipes Nos. A-1 and B-1 was 18°; since 18° was outside of the above-mentioned ranges, steel pipes Nos. A-1 and B-1 satisfied the condition P.

The feed position of steel pipes Nos. A-2 and B-2 was 113°. Since 23°, which was obtained by subtracting 90° from 113°, was outside of the above-mentioned ranges, steel pipes Nos. A-2 and B-2 satisfied the condition P.

The feed position of steel pipes Nos. A-3 and B-3 was 205°. Since 25°, which was obtained by subtracting 90°×2 from 205°, was outside of the above-mentioned ranges, steel pipes Nos. A-3 and B-3 satisfied the condition P.

The feed position of steel pipes Nos. A-4 and B-4 was 337°. Since 67°, which was obtained by subtracting 90°×3 from 337°, was outside of the above-mentioned ranges, steel pipes Nos. A-4 and B-4 satisfied the condition P.

The feed position of steel pipes Nos. A-5 and B-5 was 70°. Since 70° was outside of the above-mentioned ranges, steel pipes Nos. A-5 and B-5 satisfied the condition P.

The feed position of steel pipes Nos. A-6 and B-6 was 108°. Since 18°, which was obtained by subtracting 90° from 108°, was outside of the above-mentioned ranges, steel pipes Nos. A-6 and B-6 satisfied the condition P.

The feed position of steel pipes Nos. A-10 and B-10 was 113°. Since 23°, which was obtained by subtracting 90° from 113°, was outside of the above-mentioned ranges, steel pipes Nos. A-10 and B-10 satisfied the condition P.

The feed position of steel pipes Nos. A-9 and B-9 was 35°. Since 35° was within the above-mentioned ranges, steel pipes Nos. A-9 and B-9 did not satisfy the condition P (see "REGION TO BE AVOIDED" in FIG. 8).

The feed position of steel pipes Nos. A-11 and B-11 was 12°. Since 12° was within the above-mentioned ranges, steel pipes Nos. A-11 and B-11 did not satisfy the condition P.

The feed position of steel pipes Nos. A-13 and B-13 was 255°. Since 75°, which was obtained by subtracting 90°×2 from 255°, was within the above-mentioned ranges, steel pipes Nos. A-13 and B-13 did not satisfy the condition P.

The feed position of steel pipes Nos. A-14 and B-14 was 35°. Since 35° was within the above-mentioned ranges, steel pipes Nos. A-14 and B-14 did not satisfy the condition P.

The feed position of steel pipes Nos. A-15 and B-15 was 46°. Since 46° was within the above-mentioned ranges, steel pipes Nos. A-15 and B-15 did not satisfy the condition P.

Regarding the stretch reduction patterns C and D (n=4 for both), the instances in which the condition P of the manufacturing conditions of the disclosed embodiments were satisfied are as follows: for respective ones of the stands Nos. 5 to 8, which had a stretch reduction ratio of 5.0% or greater, instances in which the feed position of the seam (electric resistance welded seam) was not located within regions having a range of ±5.0° with respect to respective phase angles of 11.25°, 56.25°, 78.75°, and 33.75°, and in addition, the feed position of the seam (electric resistance welded seam) was not located within regions having a range of ±5.0° with respect to respective phase angles of the foregoing angles ±45° (=360°/(4×2)), namely, −33.75° (regarded as 56.25° (90° added to)−33.75° for evaluation), 56.25°, 11.25°, 101.25° (regarded as 11.25° (90° subtracted from 101.25°) for evaluation), 33.75°, 123.75° (regarded as 33.75° (90° subtracted from 123.75°) for evaluation), −11.25° (regarded as 78.75° (90° added to)−11.25° for evaluation), and 78.75°.

Regarding the steel pipes that employed the stretch reduction pattern C or D, the feed position of steel pipes Nos. A-7 and B-7 was 180°; since 0°, which was obtained by subtracting 90°×2 from 180°, was outside of the above-mentioned ranges, steel pipes Nos. A-7 and B-7 satisfied the condition P.

The feed position of steel pipes Nos. A-8 and B-8 was 226°. Since 46°, which was obtained by subtracting 90°×2 from 226°, was outside of the above-mentioned ranges, steel pipes Nos. A-8 and B-8 satisfied the condition P.

The feed position of steel pipes Nos. A-12 and B-12 was 226°. Since 46°, which was obtained by subtracting 90°×2 from 226°, was outside of the above-mentioned ranges, steel pipes Nos. A-12 and B-12 satisfied the condition P.

The feed position of steel pipes Nos. A-16 and B-16 was 79°. Since 79° was within the above-mentioned ranges, steel pipes Nos. A-16 and B-16 did not satisfy the condition P.

Regarding the stretch reduction pattern E (n=3), the instances in which the condition P of the manufacturing conditions of the disclosed embodiments were satisfied are as follows: for respective ones of the stands Nos. 5 to 10, which had a stretch reduction ratio of 5.0% or greater, instances in which the feed position of the seam (electric resistance welded seam) was not located within regions having a range of ±5.0° with respect to respective phase angles of 15°, 75°, 105°, 45°, 0°, and 60°, and in addition, the feed position of the seam (electric resistance welded seam) was not located within regions of respective phase angles of the foregoing angles ±60° (=360°/(3×2)), namely, −45° (regarded as 75° (120° added to)−45° for evaluation), 75°, 45°, 165° (regarded as 45° (120° subtracted from 165°) for evaluation), 0°, and 120° (regarded as 0° (120° subtracted from 120°) for evaluation).

The feed position of steel pipes Nos. A-17 and B-17 was 23°. Since 23° was outside of the above-mentioned ranges, steel pipes Nos. A-17 and B-17 satisfied the condition P.

The feed position of steel pipes Nos. A-18 and B-18 was 165°. Since 45°, which was obtained by subtracting 120° from 165°, was within the above-mentioned ranges, steel pipes Nos. A-18 and B-18 did not satisfy the condition P.

The feed position of steel pipes Nos. A-19 and B-19 was 342°. Since 102°, which was obtained by subtracting 120°×2 from 342°, was within the above-mentioned ranges, steel pipes Nos. A-19 and B-19 did not satisfy the condition P.

Furthermore, Table 3 and Table 4 show target outside diameters and target sheet thicknesses for the end products, together with actual outside diameters resulting from the stretch reduction. Furthermore, from a cross section of each of the steel pipes, $Ts_{(MAX)}$, $Ts_{(MIN)}$, $Tb_{(ave)}$, and $Db_{(ave)}$ were measured, and W and H were calculated.

Subsequently, these electric resistance welded steel pipes were subjected to an induction hardening process and a tempering process. Note that the induction hardening process was a process in which the steel pipes were heated under the conditions of a heating temperature of 950° C. and a holding time of 1 s and were subsequently water-quenched. In the tempering process, the steel pipes were held at 190° C. for 1 hour and subsequently air-cooled.

After the stretch reduction rolling and the heat treatments were performed, a tensile test was conducted to determine a tensile strength TS and the r-value. For the tensile test, a JIS No. 12-A tensile test specimen was cut from the base metal region of the steel pipe, and a strain gauge with a gauge length of 2 mm was bonded to the tensile test specimen; accordingly, the test was conducted. The tensile strength TS was determined from the result of the tensile test. Furthermore, the r-value was determined as follows. A tension application was performed in which a 5 to 10% nominal strain was applied, then, a width-direction true strain eW with respect to a longitudinal-direction true strain eL was measured, and the r-value was calculated according to the equation of r-value=$\rho/(-1-\rho)$, where $\rho$ is the obtained slope.

Furthermore, a torsional fatigue test specimen having a pipe shape (length: 450 mm) was cut from the obtained stretch-reduction-rolled steel pipe, and a torsional fatigue test was conducted. The torsional fatigue test was conducted under conditions including an applied stress (outer surface) of 600 MPa, a stress ratio of −1 (alternating), a frequency of 2 Hz, and a waveform of a sine wave. The number of cycles until failure was measured to evaluate the fatigue resistance. In the disclosed embodiments, the determination that the torsional fatigue property was improved was made in instances in which the number of cycles until failure was greater than or equal to 2.0 times that of a comparative example that had the same stretch reduction schedule, the same end product dimensions (the same combination of the target wall thickness and the target outside diameter), and the same steel grade.

For the evaluation of plug galling, the electric resistance welded steel pipe, which was used as a hollow pipe, was drawn by cold drawing. Specifically, a plug was inserted into the steel pipe, and the steel pipe was drawn through a die. In such an instance, when the inner periphery of the electric resistance welded steel pipe protrudes and causes a scratch called plug galling to be formed in the plug, the scratch can cause a defect in the processing of other steel pipes.

The evaluation was performed as follows. After the drawing was performed by cold drawing, visual examination was performed to see whether the surface of the plug had a defect, and, accordingly, the determination as to the presence or absence of a defect was made. Steel pipes without defects were determined to have excellent formability.

The results obtained are shown in Table 3 and Table 4. As previously mentioned, Table 3 shows the results of steels Nos. A, and Table 4 shows the results of steels Nos. B.

Table 3 and Table 4 demonstrate that in all of the Examples, H/W was less than or equal to 0.10, $Ts_{(MAX)}/Tb_{(Ave)}$ was less than or equal to 1.05, and the r-value was greater than or equal to 1.0. Furthermore, the steel pipes of the Examples did not cause defects on the surface of the plug and, therefore, had excellent formability, and the steel pipes also exhibited an improved torsional fatigue property compared with the electric resistance welded steel pipes of the related art in the high-load test.

On the other hand, for steel pipes Nos. A-9 and B-9, which are comparative examples, the feed position of the seam (electric resistance welded seam) did not satisfy the condition P, and as a result, H/W was outside the range of the disclosed embodiments; consequently, the desired torsional fatigue resistance was not achieved.

Furthermore, for steel pipes Nos. A-10 and B-10, the heating temperature for the stretch reduction rolling was less than 650° C., and as a result, the r-value was less than 1.0; consequently, the desired formability was not achieved.

Furthermore, for steel pipes Nos. A-11 and B-11, the feed position of the seam (electric resistance welded seam) did not satisfy the condition P, and as a result, $Ts_{(MAX)}/Tb_{(Ave)}$ was outside the range of the disclosed embodiments; consequently, a defect occurred on the plug during the cold drawing.

Furthermore, for steel pipes Nos. A-12 and B-12, the accumulated stretch reduction ratio was less than 30%, and as a result, the r-value was less than 1.0; consequently, the desired formability was not achieved.

Furthermore, for steel pipes Nos. A-13 and B-13, the feed position of the seam (electric resistance welded seam) did not satisfy the condition P, and as a result, H/W was outside the range of the disclosed embodiments; consequently, the desired torsional fatigue resistance was not achieved.

Furthermore, for steel pipes Nos. A-14 and B-14, the feed position of the seam (electric resistance welded seam) did not satisfy the condition P, and as a result, H/W and $Ts_{(MAX)}/Tb_{(Ave)}$ were outside the ranges of the disclosed embodiments; consequently, the desired torsional fatigue resistance was not achieved, and a defect occurred on the plug during the cold drawing.

Furthermore, for steel pipes Nos. A-15 and B-15, the feed position of the seam (electric resistance welded seam) did not satisfy the condition P, and as a result, H/W was outside the range of the disclosed embodiments; consequently, the desired torsional fatigue resistance was not achieved.

Furthermore, for steel pipes Nos. A-16 and B-16, the feed position of the seam (electric resistance welded seam) did not satisfy the condition P, and as a result, H/W was outside the range of the disclosed embodiments; consequently, the desired torsional fatigue resistance was not achieved.

Furthermore, for steel pipes Nos. A-18 and B-18, the feed position of the seam (electric resistance welded seam) did not satisfy the condition P, and as a result, H/W was outside the range of the disclosed embodiments; consequently, the desired torsional fatigue resistance was not achieved.

Furthermore, for steel pipes Nos. A-19 and B-19, the feed position of the seam (electric resistance welded seam) did not satisfy the condition P, and as a result, $Ts_{(MAX)}/Tb_{(Ave)}$ was outside the range of the disclosed embodiments; consequently, a defect occurred on the plug during the cold drawing.

TABLE 1

| Steel No. | Chemical composition (mass %) | | | | | | | | | | | | | | |
| --- | --- | --- | --- | --- | --- | --- | --- | --- | --- | --- | --- | --- | --- | --- | --- |
| | C | Si | Mn | P | S | Cr | Ti | Al | V | Nb | Mo | Cu | Ni | B | N |
| A | 0.35 | 0.22 | 1.25 | 0.001 | 0.003 | 0.152 | 0.035 | 0.035 | 0.003 | 0.001 | 0.21 | 0.313 | 0.317 | 0.0021 | 0.002 |
| B | 0.23 | 0.21 | 0.60 | 0.001 | 0.003 | 0.332 | 0.016 | 0.023 | 0.052 | 0.015 | 0.05 | 0.226 | 0.292 | 0.0026 | 0.003 |

The balance, other than the above components, is Fe and incidental impurities.

TABLE 2

| Stretch reduction schedule | | A (4-roll) | | B (4-roll) | | C (4-roll) | | D (4-roll) | | E (3-roll) | |
|---|---|---|---|---|---|---|---|---|---|---|---|
| | | Stretch reduction ratio (%) | Phase angle (°) | Stretch reduction ratio (%) | Phase angle (°) | Stretch reduction ratio (%) | Phase angle (°) | Stretch reduction ratio (%) | Phase angle (°) | Stretch reduction ratio (%) | Phase angle (°) |
| Stand No. | 1 | 2.0 | 0 | 2.0 | 0 | 1.0 | 0 | 1.0 | 0 | 2.0 | 0 |
| | 2 | 2.0 | 45 | 2.0 | 45 | 2.0 | 45 | 2.0 | 45 | 2.0 | 60 |
| | 3 | 3.0 | 22.5 | 4.0 | 22.5 | 3.0 | 22.5 | 3.0 | 22.5 | 3.0 | 30 |
| | 4 | 4.0 | 67.5 | 4.0 | 67.5 | 4.0 | 67.5 | 3.0 | 67.5 | 4.0 | 90 |
| | 5 | 5.0 | 11.25 | 6.0 | 11.25 | 5.0 | 11.25 | 5.0 | 11.25 | 5.0 | 15 |
| | 6 | 7.0 | 56.25 | 7.0 | 56.25 | 5.0 | 56.25 | 5.0 | 56.25 | 7.0 | 75 |
| | 7 | 7.0 | 78.75 | 10.0 | 78.75 | 5.0 | 78.75 | 5.0 | 78.75 | 7.0 | 105 |
| | 8 | 5.0 | 33.75 | 10.0 | 33.75 | 5.0 | 33.75 | 5.0 | 33.75 | 7.0 | 45 |
| | 9 | 5.0 | 0 | 7.0 | 0 | 4.0 | 0 | 3.0 | 0 | 7.0 | 0 |
| | 10 | 5.0 | 45 | 6.0 | 45 | 2.0 | 45 | 1.0 | 45 | 5.0 | 60 |
| | 11 | 4.0 | 22.5 | 4.0 | 22.5 | 1.0 | 22.5 | 0.5 | 22.5 | 4.0 | 30 |
| | 12 | 3.0 | 67.5 | 3.0 | 67.5 | 0.5 | 67.5 | 0.5 | 67.5 | 3.0 | 90 |
| | 13 | 2.0 | 11.25 | 2.0 | 11.25 | | | | | 2.0 | 15 |
| | 14 | 2.0 | 56.25 | 2.0 | 56.25 | | | | | 2.0 | 75 |
| | 15 | 1.0 | 78.75 | 1.0 | 78.75 | | | | | 1.0 | 105 |
| | 16 | 0.5 | 33.75 | 0.5 | 33.75 | | | | | 0.5 | 45 |

TABLE 3

| Steel Pipe No. | Outside diameter before stretch reduction (mm) | Outside diameter after stretch reduction (mm) | Accumulated stretch reduction ratio (%) | Tb(Ave)/Db(Ave) × 100 (%) | Heating temperature (° C.) | Stretch reduction schedule | Target outside diameter (mm) | Target wall thickness (mm) | Seam position Feed position (°) | Base metal region Tb(ave) (mm) | Seam region W (mm) | Seam region Ts(min) (mm) |
|---|---|---|---|---|---|---|---|---|---|---|---|---|
| A-1 | 50.0 | 27.83 | 44.3 | 16.3 | 680 | A | 27.8 | 4.50 | 18 | 4.53 | 3.3 | 4.61 |
| A-2 | 50.0 | 27.76 | 44.5 | 16.2 | 750 | A | 27.8 | 4.50 | 113 | 4.50 | 3.3 | 4.35 |
| A-3 | 50.0 | 27.77 | 44.5 | 21.6 | 950 | A | 27.8 | 6.00 | 205 | 6.01 | 2.7 | 5.81 |
| A-4 | 50.0 | 27.92 | 44.2 | 21.8 | 830 | A | 27.8 | 6.00 | 337 | 6.08 | 2.8 | 6.31 |
| A-5 | 50.0 | 27.68 | 44.6 | 27.2 | 680 | A | 27.8 | 7.50 | 70 | 7.52 | 2.2 | 7.56 |
| A-6 | 50.0 | 24.12 | 51.8 | 18.7 | 880 | B | 24.1 | 4.50 | 108 | 4.51 | 2.6 | 4.5 |
| A-7 | 65.0 | 44.36 | 31.8 | 16.8 | 720 | C | 44.3 | 7.50 | 180 | 7.45 | 5.1 | 7.32 |
| A-8 | 65.0 | 44.15 | 32.1 | 17.1 | 850 | C | 44.3 | 7.50 | 226 | 7.56 | 5.1 | 7.85 |
| A-9 | 50.0 | 27.52 | 45.0 | 16.4 | 950 | A | 27.8 | 4.50 | 35 | 4.52 | 3.2 | 4.08 |
| A-10 | 50.0 | 27.46 | 42.7 | 16.4 | 550 | A | 27.8 | 4.50 | 113 | 4.51 | 3.2 | 4.48 |
| A-11 | 50.0 | 27.50 | 45.0 | 19.9 | 800 | A | 27.8 | 4.50 | 12 | 5.48 | 2.9 | 5.68 |
| A-12 | 65.0 | 45.95 | 29.3 | 16.4 | 830 | D | 45.9 | 4.50 | 226 | 7.53 | 5.4 | 7.15 |
| A-13 | 50.0 | 27.42 | 45.2 | 21.8 | 920 | A | 27.8 | 6.00 | 255 | 5.98 | 2.7 | 5.28 |
| A-14 | 50.0 | 27.68 | 44.6 | 27.2 | 680 | A | 27.8 | 7.50 | 35 | 7.52 | 2.2 | 7.22 |
| A-15 | 50.0 | 24.28 | 51.4 | 18.5 | 790 | B | 24.1 | 4.50 | 46 | 4.50 | 2.7 | 3.95 |
| A-16 | 65.0 | 44.28 | 31.9 | 17.0 | 850 | C | 44.3 | 7.50 | 79 | 7.52 | 5.1 | 6.74 |
| A-17 | 50.0 | 26.61 | 46.8 | 17.5 | 750 | E | 26.6 | 4.50 | 23 | 4.66 | 3.0 | 4.61 |
| A-18 | 50.0 | 26.58 | 46.8 | 16.6 | 950 | E | 26.6 | 4.50 | 165 | 4.42 | 3.1 | 3.98 |
| A-19 | 50.0 | 26.84 | 46.3 | 17.1 | 800 | E | 26.6 | 4.50 | 342 | 4.58 | 3.1 | 4.55 |

| Steel Pipe No. | Seam region Ts(MAX) (mm) | H (mm) | H/W | Ts(Max)/Tb(Ave) | Tensile strength TS (MPa) | r-value | Torsional fatigue cycles (×10^6) | Comparative example of same dimensions | Improvement ratio | Plug galling | Notes |
|---|---|---|---|---|---|---|---|---|---|---|---|
| A-1 | 4.72 | −0.08 | −0.02 | 1.04 | 1844 | 1.2 | 1.5 | A-9 | 2.1 | No | Example |
| A-2 | 4.37 | 0.15 | 0.05 | 0.97 | 1858 | 1.2 | 1.5 | A-9 | 2.0 | No | Example |
| A-3 | 5.94 | 0.20 | 0.07 | 0.99 | 1881 | 1.7 | 1.3 | A-13 | 2.2 | No | Example |
| A-4 | 6.32 | −0.23 | −0.08 | 1.04 | 1916 | 1.6 | 1.9 | A-13 | 3.3 | No | Example |
| A-5 | 7.66 | −0.04 | −0.02 | 1.02 | 1865 | 1.3 | 1.9 | A-14 | 2.8 | No | Example |
| A-6 | 4.60 | 0.01 | 0.00 | 1.02 | 1872 | 1.5 | 1.4 | A-15 | 2.0 | No | Example |
| A-7 | 7.52 | 0.13 | 0.03 | 1.01 | 1870 | 1.1 | 1.7 | A-16 | 2.2 | No | Example |
| A-8 | 7.86 | −0.29 | −0.06 | 1.04 | 1868 | 1.5 | 1.6 | A-16 | 2.1 | No | Example |
| A-9 | 4.61 | 0.44 | 0.14 | 1.02 | 1910 | 1.6 | 0.7 | — | — | No | Comparative Example |
| A-10 | 4.56 | 0.03 | 0.01 | 1.01 | 1914 | 0.9 | 1.3 | — | — | No | Comparative Example |
| A-11 | 6.14 | −0.20 | −0.07 | 1.12 | 1854 | 1.5 | 1.9 | — | — | Yes | Comparative Example |

TABLE 3-continued

| | | | | | | | | | | | |
|---|---|---|---|---|---|---|---|---|---|---|---|
| A-12 | 7.76 | 0.38 | 0.07 | 1.03 | 1870 | 0.9 | 1.8 | — | — | No | Comparative Example |
| A-13 | 5.68 | 0.70 | 0.26 | 0.95 | 1883 | 1.6 | 0.6 | — | — | No | Comparative Example |
| A-14 | 8.05 | 0.30 | 0.14 | 1.07 | 1911 | 1.3 | 0.7 | — | — | Yes | Comparative Example |
| A-15 | 4.19 | 0.55 | 0.21 | 0.93 | 1919 | 1.5 | 0.7 | — | — | No | Comparative Example |
| A-16 | 7.37 | 0.78 | 0.15 | 0.98 | 1897 | 1.4 | 0.8 | — | — | No | Comparative Example |
| A-17 | 4.89 | 0.05 | 0.02 | 1.05 | 1901 | 1.4 | 1.5 | A-18 | 2.0 | No | Example |
| A-18 | 4.15 | 0.44 | 0.14 | 0.94 | 1908 | 1.7 | 0.7 | — | — | No | Comparative Example |
| A-19 | 5.22 | 0.03 | 0.01 | 1.14 | 1894 | 1.6 | 1.4 | — | — | Yes | Comparative Example |

TABLE 4

| Steel Pipe No. | Outside diameter before stretch reduction (mm) | Outside diameter after stretch reduction (mm) | Accumulated stretch reduction ratio (%) | $T_b(Ave)/D_b(Ave) \times 100$ (%) | Heating temperature (°C) | Stretch reduction schedule | Target outside diameter (mm) | Target wall thickness (mm) | Seam position Feed position (°) | Base metal region $T_b(ave)$ (mm) | Seam region W (mm) | Seam region $T_s(min)$ (mm) |
|---|---|---|---|---|---|---|---|---|---|---|---|---|
| B-1 | 50.0 | 27.83 | 44.3 | 16.3 | 680 | A | 27.8 | 4.50 | 18 | 4.51 | 3.3 | 4.58 |
| B-2 | 50.0 | 27.76 | 44.5 | 16.2 | 750 | A | 27.8 | 4.50 | 113 | 4.49 | 3.3 | 4.38 |
| B-3 | 50.0 | 27.77 | 44.5 | 21.6 | 950 | A | 27.8 | 6.00 | 205 | 5.96 | 2.8 | 5.77 |
| B-4 | 50.0 | 27.92 | 44.2 | 21.8 | 830 | A | 27.8 | 6.00 | 337 | 6.04 | 2.7 | 6.15 |
| B-5 | 50.0 | 27.68 | 44.6 | 27.2 | 680 | A | 27.8 | 7.50 | 70 | 7.49 | 2.2 | 7.44 |
| B-6 | 50.0 | 24.12 | 51.8 | 18.7 | 880 | B | 24.1 | 4.50 | 108 | 4.52 | 2.7 | 4.45 |
| B-7 | 65.0 | 44.36 | 31.8 | 16.8 | 720 | C | 44.3 | 7.50 | 180 | 7.54 | 5.1 | 7.44 |
| B-8 | 65.0 | 44.15 | 32.1 | 17.1 | 850 | C | 44.3 | 7.50 | 226 | 7.50 | 5.1 | 7.48 |
| B-9 | 50.0 | 27.52 | 45.0 | 16.4 | 950 | A | 27.8 | 4.50 | 35 | 4.53 | 3.2 | 4.01 |
| B-10 | 50.0 | 27.46 | 42.7 | 16.4 | 550 | A | 27.8 | 4.50 | 113 | 4.48 | 3.3 | 4.48 |
| B-11 | 50.0 | 27.50 | 45.0 | 19.9 | 800 | A | 27.8 | 4.50 | 12 | 5.52 | 2.9 | 5.67 |
| B-12 | 65.0 | 45.95 | 29.3 | 16.4 | 830 | D | 45.9 | 4.50 | 226 | 7.48 | 5.4 | 7.19 |
| B-13 | 50.0 | 27.42 | 45.2 | 21.8 | 920 | A | 27.8 | 6.00 | 255 | 6.02 | 2.7 | 5.33 |
| B-14 | 50.0 | 27.68 | 44.6 | 27.2 | 680 | A | 27.8 | 7.50 | 35 | 7.48 | 2.2 | 7.19 |
| B-15 | 50.0 | 24.28 | 51.4 | 18.5 | 790 | B | 24.1 | 4.50 | 46 | 4.55 | 2.6 | 3.99 |
| B-16 | 65.0 | 44.28 | 31.9 | 17.0 | 850 | C | 44.3 | 7.50 | 79 | 7.50 | 5.1 | 6.87 |
| B-17 | 50.0 | 26.61 | 46.8 | 17.5 | 750 | E | 26.6 | 4.50 | 23 | 4.66 | 3.0 | 4.61 |
| B-18 | 50.0 | 26.58 | 46.8 | 16.6 | 950 | E | 26.6 | 4.50 | 165 | 4.42 | 3.1 | 3.98 |
| B-19 | 50.0 | 26.84 | 46.3 | 17.1 | 800 | E | 26.6 | 4.50 | 342 | 4.58 | 3.1 | 4.83 |

| Steel Pipe No. | Seam region $T_s(MAX)$ (mm) | H (mm) | H/W | $T_s(Max)/T_b(Ave)$ | Tensile strength TS (MPa) | r-value | Torsional fatigue cycles (×10^6) | Comparative example of same dimensions | Improvement ratio | Plug galling | Notes |
|---|---|---|---|---|---|---|---|---|---|---|---|
| B-1 | 4.65 | −0.07 | −0.02 | 1.03 | 1601 | 1.4 | 1.4 | B-9 | 2.2 | No | Example |
| B-2 | 4.53 | 0.11 | 0.03 | 1.01 | 1563 | 1.2 | 1.3 | B-9 | 2.1 | No | Example |
| B-3 | 5.78 | 0.19 | 0.07 | 0.97 | 1582 | 1.8 | 1.3 | B-13 | 2.5 | No | Example |
| B-4 | 6.22 | −0.11 | −0.04 | 1.03 | 1544 | 1.6 | 1.7 | B-13 | 3.3 | No | Example |
| B-5 | 7.79 | 0.05 | 0.02 | 1.04 | 1585 | 1.4 | 1.5 | B-14 | 2.3 | No | Example |
| B-6 | 4.47 | 0.07 | 0.03 | 0.99 | 1610 | 1.4 | 1.3 | B-15 | 2.0 | No | Example |
| B-7 | 7.69 | 0.10 | 0.02 | 1.02 | 1621 | 1.2 | 1.6 | B-16 | 2.0 | No | Example |
| B-8 | 7.50 | 0.02 | 0.00 | 1.00 | 1604 | 1.6 | 1.6 | B-16 | 2.0 | No | Example |
| B-9 | 4.62 | 0.52 | 0.16 | 1.02 | 1588 | 1.4 | 0.6 | — | — | No | Comparative Example |
| B-10 | 4.52 | 0.00 | 0.00 | 1.01 | 1593 | 0.9 | 1.2 | — | — | No | Comparative Example |
| B-11 | 6.24 | −0.15 | −0.05 | 1.13 | 1611 | 1.6 | 1.7 | — | — | Yes | Comparative Example |
| B-12 | 7.55 | 0.29 | 0.05 | 1.01 | 1595 | 0.9 | 1.3 | — | — | No | Comparative Example |
| B-13 | 5.84 | 0.69 | 0.25 | 0.97 | 1574 | 1.5 | 0.5 | — | — | No | Comparative Example |
| B-14 | 7.93 | 0.29 | 0.13 | 1.06 | 1608 | 1.3 | 0.6 | — | — | Yes | Comparative Example |
| B-15 | 4.14 | 0.56 | 0.21 | 0.91 | 1616 | 1.4 | 0.6 | — | — | No | Comparative Example |

TABLE 4-continued

| | | | | | | | | | | | |
|---|---|---|---|---|---|---|---|---|---|---|---|
| B-16 | 7.35 | 0.63 | 0.12 | 0.98 | 1604 | 1.5 | 0.8 | — | — | No | Comparative Example |
| B-17 | 4.85 | 0.05 | 0.02 | 1.04 | 1557 | 1.3 | 1.4 | B-19 | 2.0 | No | Example |
| B-18 | 4.20 | 0.44 | 0.14 | 0.95 | 1524 | 1.7 | 0.7 | — | — | No | Comparative Example |
| B-19 | 5.18 | −0.25 | −0.08 | 1.13 | 1523 | 1.6 | 1.5 | — | — | Yes | Comparative Example |

The invention claimed is:

1. An electric resistance welded steel pipe comprising:
a seam region having a range of ±10° in a pipe circumferential direction with respect to an electric resistance welded seam formed in a pipe longitudinal direction; and
a base metal region being a region other than the seam region,
wherein the electric resistance welded steel pipe has an r-value in the pipe longitudinal direction of 1.0 or greater,
H (mm) and W (mm) satisfy the following formula (1):

$$H/W \leq 0.10 \quad (1)$$

where H (mm) is a difference between $Ts_{(MIN)}$ (mm) and $Tb_{(Ave)}$ (mm) ($Tb_{(Ave)} - TS_{(MIN)}$), $TS_{(MIN)}$ (mm) is a minimum wall thickness value of the seam region, $Tb_{(Ave)}$ (mm) is an average wall thickness value of the base metal region, and W (mm) is an arc length of a pipe inner surface of the seam region, and
$TS_{(MAX)}$ (mm) and $Tb_{(Ave)}$ (mm) satisfy the following formula (2):

$$TS_{(MAX)}/Tb_{(Ave)} \leq 1.05 \quad (2)$$

where $Ts_{(MAX)}$ (mm) is a maximum wall thickness value of the seam region.

2. The electric resistance welded steel pipe according to claim 1, wherein $Tb_{(Ave)}$ (mm) and $Db_{(Ave)}$ (mm) satisfy formula (3):

$$(Tb_{(Ave)}/Db_{(Ave)}) \times 100 \geq 15\% \quad (3)$$

where $Db_{(Ave)}$ (mm) is an average pipe outside diameter value of the base metal region.

3. The electric resistance welded steel pipe according to claim 1, wherein the r-value is an r-value in the pipe longitudinal direction in the base metal region.

4. A method for manufacturing the electric resistance welded steel pipe according to claim 1, the method comprising:
performing a forming operation on a steel strip to form an open pipe;
performing electric resistance welding on the open pipe to form a hollow pipe; and
heating the hollow pipe at a heating temperature of 650° C. or greater and performing stretch reduction rolling on the hollow pipe at an accumulated stretch reduction ratio of 30% or greater,
wherein, in the stretch reduction rolling, in a rolling stand with a stretch reduction ratio of 5.0% or greater, the electric resistance welded seam (i) does not travel through a region of a roll, the region having a range of ±5.0° with respect to a caliber center of the roll, and (ii) does not travel through regions of the roll, the regions having a range of ±5.0° with respect to respective positions 360°/(n×2) left and right of the caliber center, where n is the number of rolls per stand.

5. An automotive structural member comprising the electric resistance welded steel pipe according to claim 1.

6. The electric resistance welded steel pipe according to claim 2, wherein the r-value is an r-value in the pipe longitudinal direction in the base metal region.

7. A method for manufacturing the electric resistance welded steel pipe according to claim 2, the method comprising:
performing a forming operation on a steel strip to form an open pipe;
performing electric resistance welding on the open pipe to form a hollow pipe; and
heating the hollow pipe at a heating temperature of 650° C. or greater and performing stretch reduction rolling on the hollow pipe at an accumulated stretch reduction ratio of 30% or greater,
wherein, in the stretch reduction rolling, in a rolling stand with a stretch reduction ratio of 5.0% or greater, the electric resistance welded seam (i) does not travel through a region of a roll, the region having a range of ±5.0° with respect to a caliber center of the roll, and (ii) does not travel through regions of the roll, the regions having a range of ±5.0° with respect to respective positions 360°/(n×2) left and right of the caliber center, where n is the number of rolls per stand.

8. A method for manufacturing the electric resistance welded steel pipe according to claim 3, the method comprising:
performing a forming operation on a steel strip to form an open pipe;
performing electric resistance welding on the open pipe to form a hollow pipe; and
heating the hollow pipe at a heating temperature of 650° C. or greater and performing stretch reduction rolling on the hollow pipe at an accumulated stretch reduction ratio of 30% or greater,
wherein, in the stretch reduction rolling, in a rolling stand with a stretch reduction ratio of 5.0% or greater, the electric resistance welded seam (i) does not travel through a region of a roll, the region having a range of ±5.0° with respect to a caliber center of the roll, and (ii) does not travel through regions of the roll, the regions having a range of ±5.0° with respect to respective positions 360°/(n×2) left and right of the caliber center, where n is the number of rolls per stand.

9. A method for manufacturing the electric resistance welded steel pipe according to claim 6, the method comprising:
performing a forming operation on a steel strip to form an open pipe;
performing electric resistance welding on the open pipe to form a hollow pipe; and
heating the hollow pipe at a heating temperature of 650° C. or greater and performing stretch reduction rolling on the hollow pipe at an accumulated stretch reduction ratio of 30% or greater, wherein, in the stretch reduction rolling, in a rolling stand with a stretch reduction ratio of 5.0% or greater, the electric resistance welded seam (i) does not travel through a region of a roll, the region having a range of ±5.0° with respect to a caliber center of the roll, and (ii) does not travel through regions of the roll, the regions having a range of ±5.0° with respect to respective positions 360°/(n×2) left and right of the caliber center, where n is the number of rolls per stand.

10. An automotive structural member comprising the electric resistance welded steel pipe according to claim 2.

11. An automotive structural member comprising the electric resistance welded steel pipe according to claim 3.

12. An automotive structural member comprising the electric resistance welded steel pipe according to claim 6.

* * * * *